United States Patent
King (10) Patent No.: US 8,190,010 B2
(45) Date of Patent: May 29, 2012

(54) METHOD AND DEVICE TO RELAY SHORT DURATION LIGHT PULSES VIA RADIO SIGNAL FOR CAMERA FLASH OPERATION

(76) Inventor: Kevin James King, Maricopa, AZ (US)

( * ) Notice: Subject to any disclaimer, the term of this patent is extended or adjusted under 35 U.S.C. 154(b) by 426 days.

(21) Appl. No.: 12/284,629

(22) Filed: Sep. 24, 2008

(65) Prior Publication Data

US 2009/0129765 A1 May 21, 2009

Related U.S. Application Data

(60) Provisional application No. 60/974,790, filed on Sep. 24, 2007.

(51) Int. Cl.
*G03B 17/00* (2006.01)
(52) U.S. Cl. .......................... 396/56; 396/171
(58) Field of Classification Search .................. 396/423, 396/56–59, 171
See application file for complete search history.

(56) References Cited

U.S. PATENT DOCUMENTS

| 4,809,359 A * | 2/1989 | Dockery ........................ 398/126 |
|---|---|---|
| 4,864,647 A * | 9/1989 | Harrington ................... 398/126 |
| 5,142,397 A * | 8/1992 | Dockery ........................ 398/126 |
| 5,283,610 A | 2/1994 | Sasaki ............................. 396/57 |
| 5,317,354 A * | 5/1994 | Kosako .......................... 396/59 |
| 5,359,375 A | 10/1994 | Clark ............................... 396/56 |
| 5,434,614 A * | 7/1995 | Dainty ............................ 348/64 |
| 6,041,185 A * | 3/2000 | Suzuki ............................ 396/56 |
| 6,272,290 B1 * | 8/2001 | Mogamiya ..................... 396/59 |
| 6,404,987 B1 | 6/2002 | Fukui .............................. 396/56 |
| 6,704,500 B2 * | 3/2004 | Takematsu ..................... 396/28 |
| 6,819,866 B2 * | 11/2004 | Da Silva ......................... 396/27 |
| 6,831,420 B1 | 12/2004 | Tohyama ....................... 315/149 |
| 6,862,407 B2 * | 3/2005 | Gale ................................ 396/59 |
| 6,987,931 B2 * | 1/2006 | Iwasaki ......................... 396/157 |
| 7,016,603 B2 | 3/2006 | Clark .............................. 396/56 |
| 7,057,174 B1 * | 6/2006 | Hopper et al. ............. 250/338.4 |
| 7,362,965 B2 | 4/2008 | Clark .............................. 396/56 |
| 7,702,228 B2 * | 4/2010 | Clark .............................. 396/56 |
| 2002/0009296 A1 * | 1/2002 | Shaper et al. .................. 396/56 |
| 2003/0151600 A1 * | 8/2003 | Takeuchi et al. ............. 345/204 |
| 2004/0100562 A1 * | 5/2004 | Ichikawa et al. ........... 348/211.1 |
| 2004/0101295 A1 | 5/2004 | Clark .............................. 396/56 |
| 2006/0203925 A1 * | 9/2006 | Pirooz et al. .................. 375/260 |
| 2006/0275024 A1 | 12/2006 | McNary ......................... 396/56 |
| 2007/0070206 A1 * | 3/2007 | Clark ........................ 348/207.99 |
| 2007/0098385 A1 * | 5/2007 | Tanaka et al. .................. 396/56 |
| 2008/0193114 A1 | 8/2008 | Clark .............................. 396/56 |
| 2008/0298792 A1 * | 12/2008 | Clark .............................. 396/56 |
| 2009/0015654 A1 * | 1/2009 | Hayashi .................... 348/14.02 |
| 2009/0129765 A1 * | 5/2009 | King ............................... 396/56 |
| 2009/0317002 A1 * | 12/2009 | Dein ............................. 382/224 |
| 2010/0008658 A1 * | 1/2010 | King ............................... 396/56 |
| 2010/0209089 A1 * | 8/2010 | King ............................... 396/56 |
| 2010/0316364 A1 * | 12/2010 | Clark .............................. 396/57 |

* cited by examiner

*Primary Examiner* — Clayton E Laballe
*Assistant Examiner* — Bret Adams (57) ABSTRACT

A device and method for retrofitting a camera system is disclosed. The method may include detecting a first signal while it is being sent by a source device of the camera system to a remote device of the camera system, and wirelessly transmitting a data stream, which may include control instructions and trigger instructions, detected in the first signal using a transmitter unit. The method may also include wirelessly receiving the data stream using a receiver unit, converting the data stream into a second signal that is substantially the same as the first signal which may include configuring the second signal as light pulses. The method may also include directing the second signal toward the remote device which may be responsive to the light pulses.

33 Claims, 12 Drawing Sheets

METHOD AND DEVICE TO RELAY SHORT DURATION LIGHT PULSES VIA RADIO SIGNAL FOR CAMERA FLASH OPERATION

RELATED U.S. APPLICATION DATA

This application claims the benefit of priority of U.S. Provisional Application No. 60/974,790, filed on Sep. 24, 2007, and titled "Device to Relay Short Duration Light Pulses via Radio Signal for Camera Flash Operation", incorporated herein by reference in its entirety.

BACKGROUND OF THE INVENTION

A camera system of the type used with the present invention includes a camera and at least one remote device, usually a supplemental flash unit. The camera system is designed to control the operation of the remote device when a source device of the camera sends a signal that is detected by the remote device. On many cameras, the source device is part of a camera flash unit that mounts to a hot-shoe of the camera. A signal can be sent from the source device to the remote device via wires, cables, pulses of light, or other common method for transmitting a signal that carries a data stream. Sometimes, an existing camera system's method for transmitting a signal is not adequate or reliable because of inherent drawbacks of the camera system.

Few camera manufacturers have opted to sell camera systems that use a radio transmission to send a signal from the source device to the remote device. Many photographers prefer a radio transmission because there are no wires or cables, and because there are failure concerns when using an infrared signal if there is too much ambient light, inadequate surfaces for reflecting light, or it is just difficult to negotiate a line of sight between the source device and the remote device. Physical obstacles and direct sunlight are not a concern when just using a radio transmission. Unfortunately, possibly due to differing government regulation of radio transmissions from country to country, the most popular camera systems transmit a signal using infrared light pulses rather than radio waves. Canon U.S.A. Inc. provides one of the most sophisticated systems, Canon's E-TTL (Evaluative Through-The-Lens) flash exposure control. Details about the structure and meaning of some of Canon's IR signals are presented in U.S. Pat. Nos. 6,404,987 and 6,831,420.

One popular solution to providing a radio operated camera system to professional photographers is to transmit a radio signal when certain camera settings are detected, such as an open shutter, and to receive a trigger instruction at the remote device that can be used to operate a flash. The problem with this solution is that the camera is not able to communicate any control instructions that are normally sent via the IR signal before the trigger instructions. To prevent the loss of these control instructions, a camera system designed to use a radio transmission would most likely use some sort of preamble signal that could modulate and otherwise prepare a transmitter and receiver just prior to the transmission of all of the information contained in an existing camera's IR signal.

Without a preamble signal, or some other way of knowing that an IR signal is about to be sent, there is no system currently available that is capable of detecting and processing an IR signal sent by a source device, establishing a radio bridge, and then retransmitting to a remote device quickly enough to support the ability of a camera system to use flash at high shutter speeds (a high speed sync). Every light pulse sent by an infrared type source device carries important information that is either part of control instructions or part of trigger instructions. There is simply no time for a radio bridge to process and determine whether a pulse train is from the environment or from the source device. The drawback of any currently available radio bridge system is the loss of the control instructions that precede the trigger instructions in a data stream normally sent by the source device to the remote device. Without having first relayed current control instructions, a trigger instruction based on a camera's shutter simply causes the remote device to flash based on manual settings of the remote device.

SUMMARY OF THE INVENTION

The present invention is a device and method for retrofitting a camera system such that a radio bridge can successfully transmit a complete data stream, which includes the control instructions and the trigger instructions sent by a source device, in near real time. The data stream can be acquired at the source device by detecting IR pulses or by plugging into a port that carries the data stream. A retrofit kit includes a transmitter unit and a receiver unit. The transmitter unit is positioned adjacent or near the source device, and the receiver unit is positioned adjacent or within sight of the remote device. The transmitter unit monitors a first signal produced by the camera, or other source device, and immediately transmits a radio signal while the first signal is still being detected—without needing to put the pulses into packets or even determine if the pulses are part of a legitimate data stream.

Frequency-Shift Keying (FSK) modulation is the preferred method for transmitting the radio signal. This continual transmission is normally used to shift a frequency of a carrier signal to indicate that a data pin has changed its state, such as from high to low. My radio signal is intentionally shifted at the end of very precise intervals of time, such as 3.50 ms (milliseconds), to prevent any random switching of the radio signal. If, for example, a data pin on a transmitter module has a low state, then a low state frequency is sent by the radio signal for 3.50 ms, but at the end of the 3.50 ms, the data pin is automatically changed to a high state, and a high state frequency is sent over the radio signal. This process of automatically shifting back and forth between high state and low state is anticipated by the receiver unit, so any change in state that is received at substantially the exact time that this automatic shifting should occur is not interpreted as being a transmission of part of a data stream from the source device. If a data pin on a transmitter module changes to a different state at any time before the 3.50 ms has elapsed, then the transmitter shifts the radio signal and the receiver receives an earlier than expected shift, so the receiver assumes that this shift is part of a data stream. The receiver unit immediately produces an IR pulse that can be seen by the remote device, thereby successfully conveying the first bit of a data stream in very near real time. The remaining bits of a data stream will similarly follow, and then the process of automatically shifting back and forth will restart.

The following is a list of numerical callouts used in FIGS. 1-7:
- 52 source device
- 54 remote device
- 72 transmitter unit
- 74 detector
- 78 inductive pickup
- 79 signal port
- 80 MCU
- 82 oscillator
- 84 transmitter module
- 85 PCB
- 86 antenna
- 87,88,90,91 and 92 user interfaces
- 102 power supply
- 106 housing
- 116 receiver unit
- 118 emitter
- 122 optical fiber
- 124 oscillator
- 126 MCU
- 128 receiver module
- 129 PCB
- 130 antenna
- 141 power supply
- 146 housing
- 152 IR detector
- 154 reflector
- 156 black tape
- 177 first signal-IR pulses
- 179 radio signal
- 282, 285 IR pulses
- 283 spacing
- 286 expected pre-flash
- 290 6.00 ms precise interval
- 292 3.50 ms precise interval
- 295 unexpected state change
- 300 second signal
- 345 actual pre-flash
- 306, 313 radio signal
- 346, 349 modulation delay

DETAILED DESCRIPTION OF THE INVENTION

Figure 1:
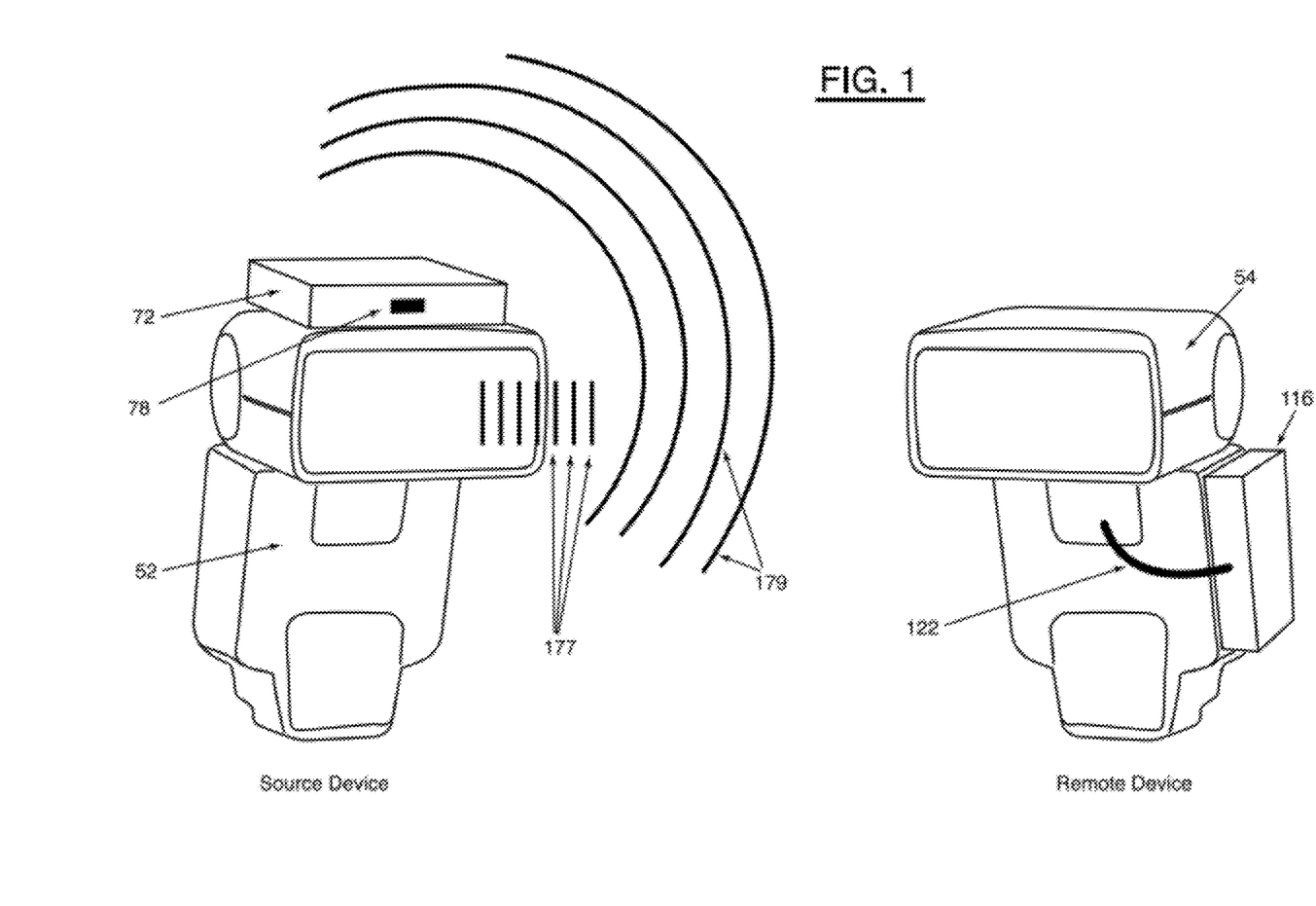
FIG. 1 is a perspective view of a camera system that has been retrofitted with the present invention.

This detailed description approximately follows the path of a data stream, which carries control instructions and trigger instructions, through a camera system that has been retrofitted with the most preferred embodiment of the present invention, shown in FIG. 1. A retrofitted camera system has a data stream that is initiated when a photographer actuates the camera. The data stream travels to a source device 52 where the data stream is converted into a first signal 177, usually pulses of infrared light. A transmitter unit 72 preferably has an inductive pickup 78 that senses an electric field produced by the source device, this electric field being generated by the source device to activate a flash tube that will create IR. After detecting the first signal, the transmitter unit changes the frequency of a continual radio transmission to indicate that an IR pulse was inductively detected. A receiver unit 116 detects an unexpected frequency shift of the radio signal 179, so the receiver unit powers an LED (light emitting diode) that produces a second signal, an IR pulse that can be observed by a remote device 54. Preferably, the light from the LED is directed toward the remote device using optical fiber 122. When the remote device detects the IR pulse, which should be followed by numerous other IR pulses to produce the second signal, the remote device responds as though it had detected the first signal.

A camera system of the type that can be retrofitted with the present invention has a source device, or master, that is capable of controlling the settings and operation of a remote device, or slave, that can produce a desired light output for flash photography. Although the source device is sometimes built into the camera itself, many of the cameras used by professional photographers have a hot-shoe for mounting the source device to the top of the camera. A source device 52 that mounts to a hot-shoe usually has a built-in flash unit, along with a user interface that allows a photographer to adjust flash settings. The hot-shoe, or any other external port that carries the data stream, can be used as a source device. All source devices include the ability to transmit the first signal to a remote device 54. The first signal 177 is usually carried by infrared or visible light, but it may be carried through wires that plug into an external port that exposes the data stream.

After the camera and/or source device 52 has computed a data stream that needs to be sent to the remote device 54, the first signal 177 is assembled and transmitted by the source device. Here is where the present invention is retrofitted into a camera system. A transmitter unit 72 of the present invention, which can be removeably attached to the source device using tape, a hook and loop type fastener or another method for removeably fastening two objects, detects the first signal while it is being transmitted by the source device. Ways of detecting the first signal, which is sent by some sort of emitter, include directly connecting the transmitter unit to an external port, which may require a special connector, or by detecting light pulses produced by a visible or infrared light emitter of the source device, as shown in FIG. 1. The latter is the preferred method of detecting the first signal. Throughout this description, the term "IR" means infrared light, visible light, and/or other light that carries a signal of a camera system.

There are several different ways of detecting the IR pulses 177 that make up the first signal which carries the data stream, the common approach being to position an IR detector, such as a photodiode or a phototransistor, in front of an IR emitter, such as an LED, of the source device. A novel alternative approach is to position one end of an optical fiber in front of the IR emitter of the source device, and to feed the other end of the optical fiber into the transmitter unit such that light will be reflected directly to an IR detector inside the transmitter unit. To make sure that the light from the IR emitter travels through the core of the optical fiber, a semi-transparent/semi-opaque cap, or other optical device capable of redirecting light, such as by reflecting or refracting light, can be placed adjacent that end of the optical fiber that is in front of the IR emitter. This cap should direct some light into the optical fiber, no matter what the angle of incidence happens to be. The IR emitter can be completely covered with a material, such as a piece of black tape (which can also be used to position the optical fiber), such that the IR is prevented from escaping into the environment. A third, and most preferred, method for detecting the first signal is by inductively detecting an electric field produced by the source device to power the IR emitter. By inductively detecting this electric field with an inductive pickup 78, a light pulse can be detected while, or just before, it is actually generated. The preferred method for inductively detecting an electric field is shown and described in U.S. Pat. No. 5,436,531, incorporated herein by reference, but not by limitation.

Figure 2:
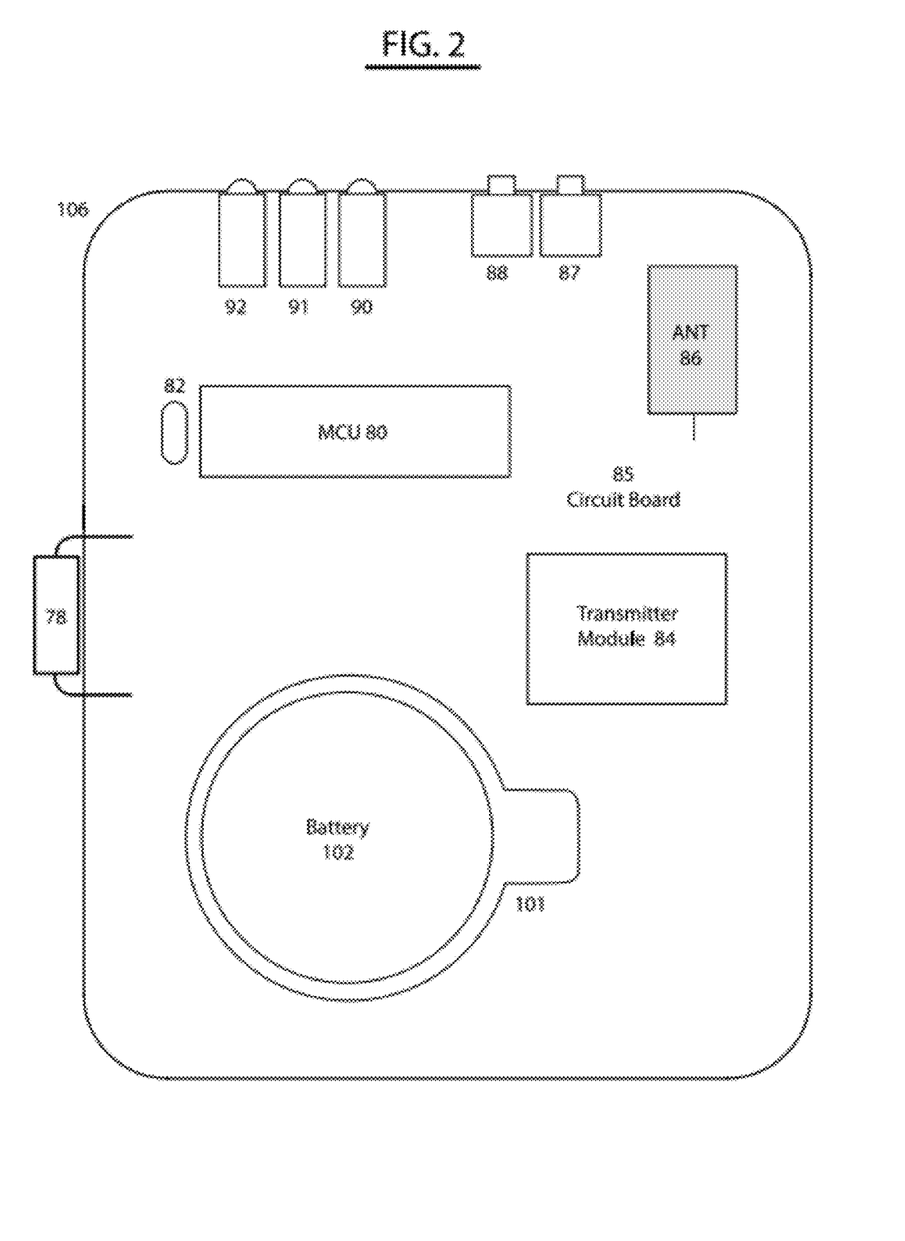
FIG. 2 is a plan view showing the internal layout of a transmitter unit of the present invention.
Figure 5:
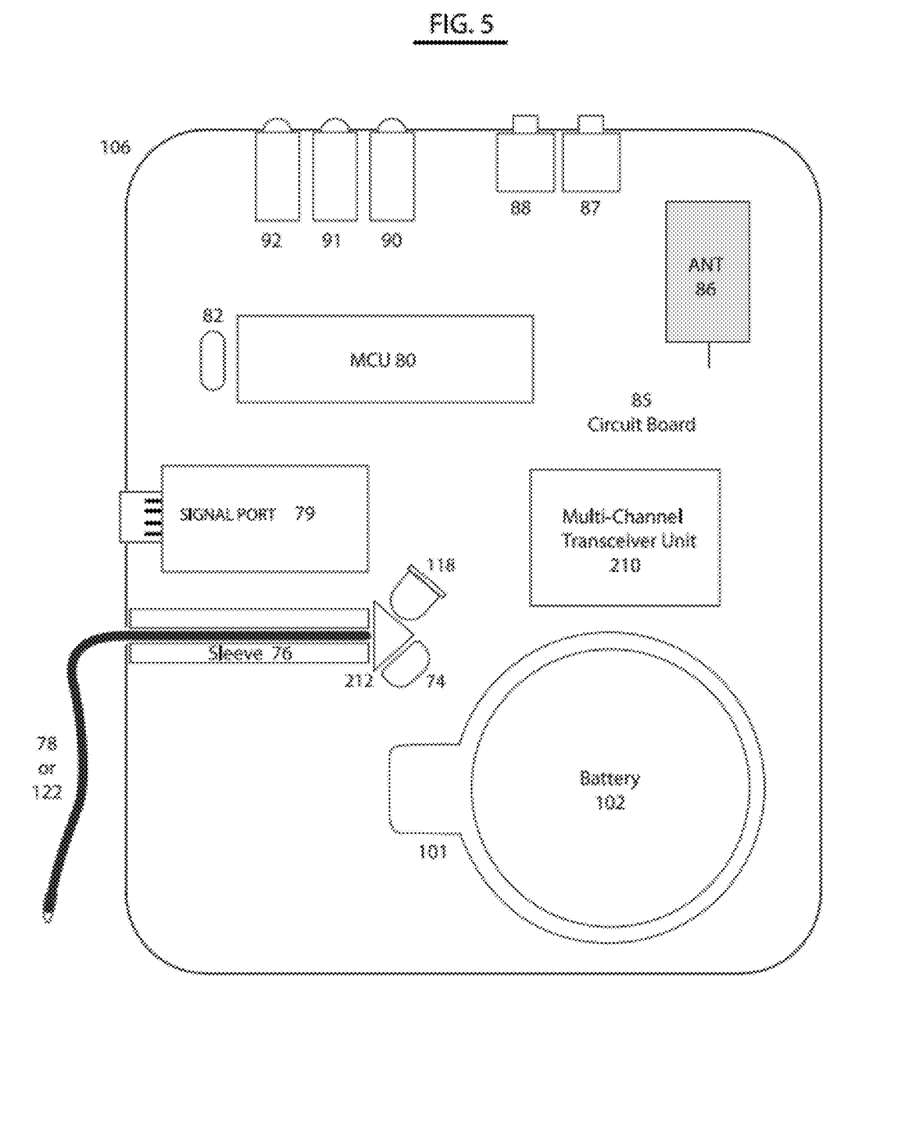
FIG. 5 is a plan view showing the internal layout of an alternate embodiment of the present invention.

The transmitter unit 72 (FIG. 2 showing one possible internal layout) detects the first signal while it is transmitting a radio signal. The major components of a transmitter unit include a housing 106, a printed circuit board 85 (PCB), a detector 74, a microcontroller 80 (MCU), a transmitter module 84, an antenna 86 and a power supply 102. The preferred transmitter module uses Frequency Shift-Keying, or FSK. Building the transmitter unit, as well as the receiver unit, should be a simple task for anyone having ordinary skill building radio units, but there are extra details in the provisional application, already incorporated by reference, for those who are less familiar with radio transmitters and receivers. Obviously, there are numerous known alternative ways of arranging readily available hardware components to build a substantially similar radio system, such as one using a transceiver module in place of a transmitter module, one using a multi-channel module rather than a single channel, or one that includes various add-ons and extra user interfaces, as desired. FIG. 5 shows a layout for a transmitter that includes several of the alternative features just mentioned.

The radio signal 179 is continually transmitted by the transmitter unit 72 as a tuned frequency that can be shifted to indicate that an input pin on the transmitter module 84 has changed states. The state of a transmitter module's input pin is either high or low. The MCU 80 needs to have an accurate clock reference, such as an external ceramic resonator or other oscillator 82, so the timing of an automatic shift in the frequency from the low state to the high state, or visa-versa, can be performed at very precise intervals. Computer code which operates the MCU is loaded to provide the transmitter unit with the functions shown in FIGS. 8 and 9.

Figure 8:
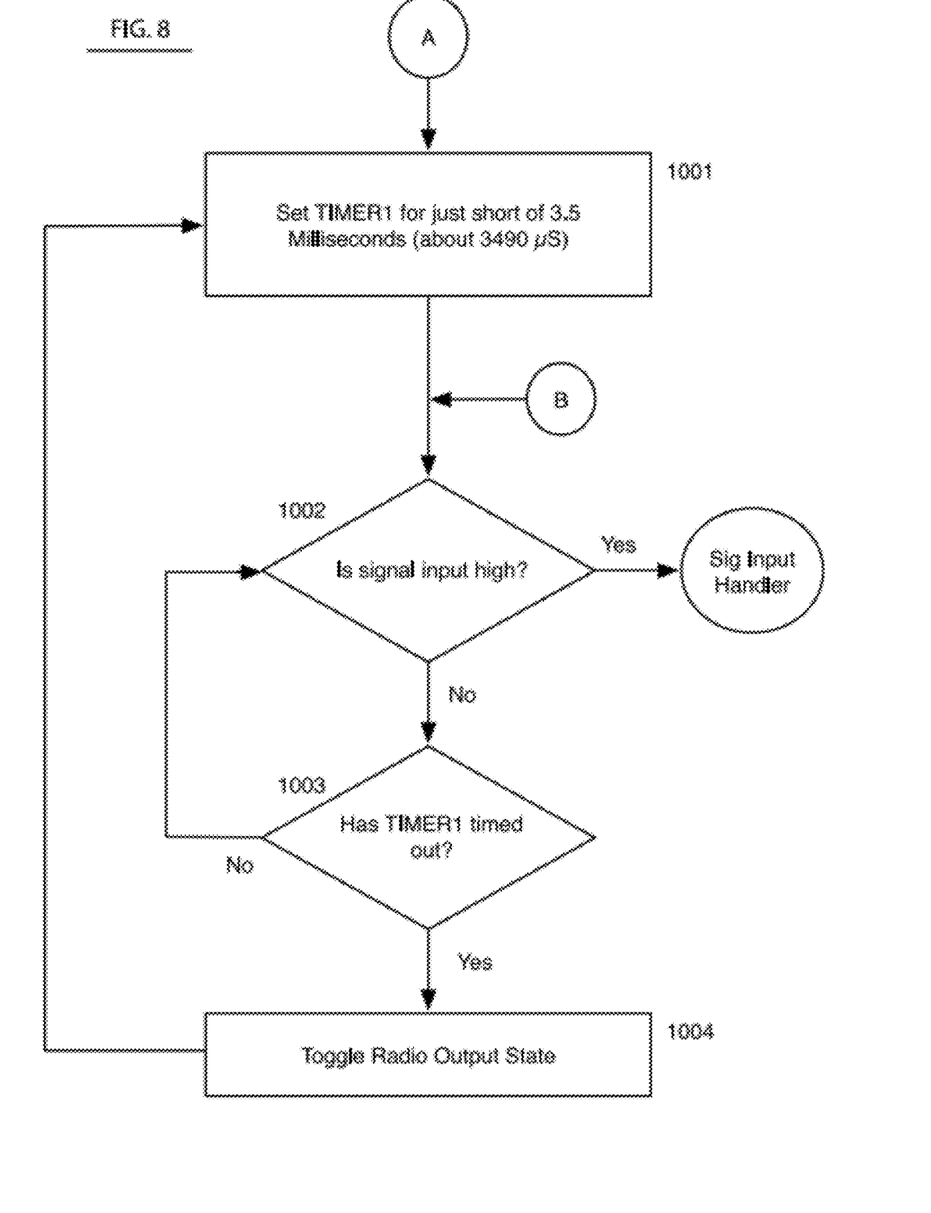
FIGS. 8 and 9 are flowcharts showing operations of the transmitter unit.

As shown in FIG. 8, the MCU for the transmitter unit starts (at A) by setting a transmitter timer for a very precise interval of time, such as 3.49 ms (1001). There will be a little processing time used to start the transmitter timer, such as 10 microseconds, so the total time for this example is about 3.50 ms. The transmitter module transmits a radio output state, either high or low, while the MCU is in a loop (1002 and 1003) checking whether an IR pulse was detected, which would show up on the MCU as a high signal input rather than as a low signal input. If the signal input remains low, this process of checking the signal input repeats until the transmitter timer times out (1003). After the transmitter timer times out, the MCU changes the state of the radio output (1004). It does not matter whether the frequency state is high or low, just that it changes at very precise intervals or for a known reason. The time of the precise interval does not need to be 3.50 ms, and it may be desirable to provide a user interface that allows this interval to be adjusted to different values. The precise interval that is best will be for as long as possible, but not so long that the radio signal will experience any random shifting.

Figure 6:
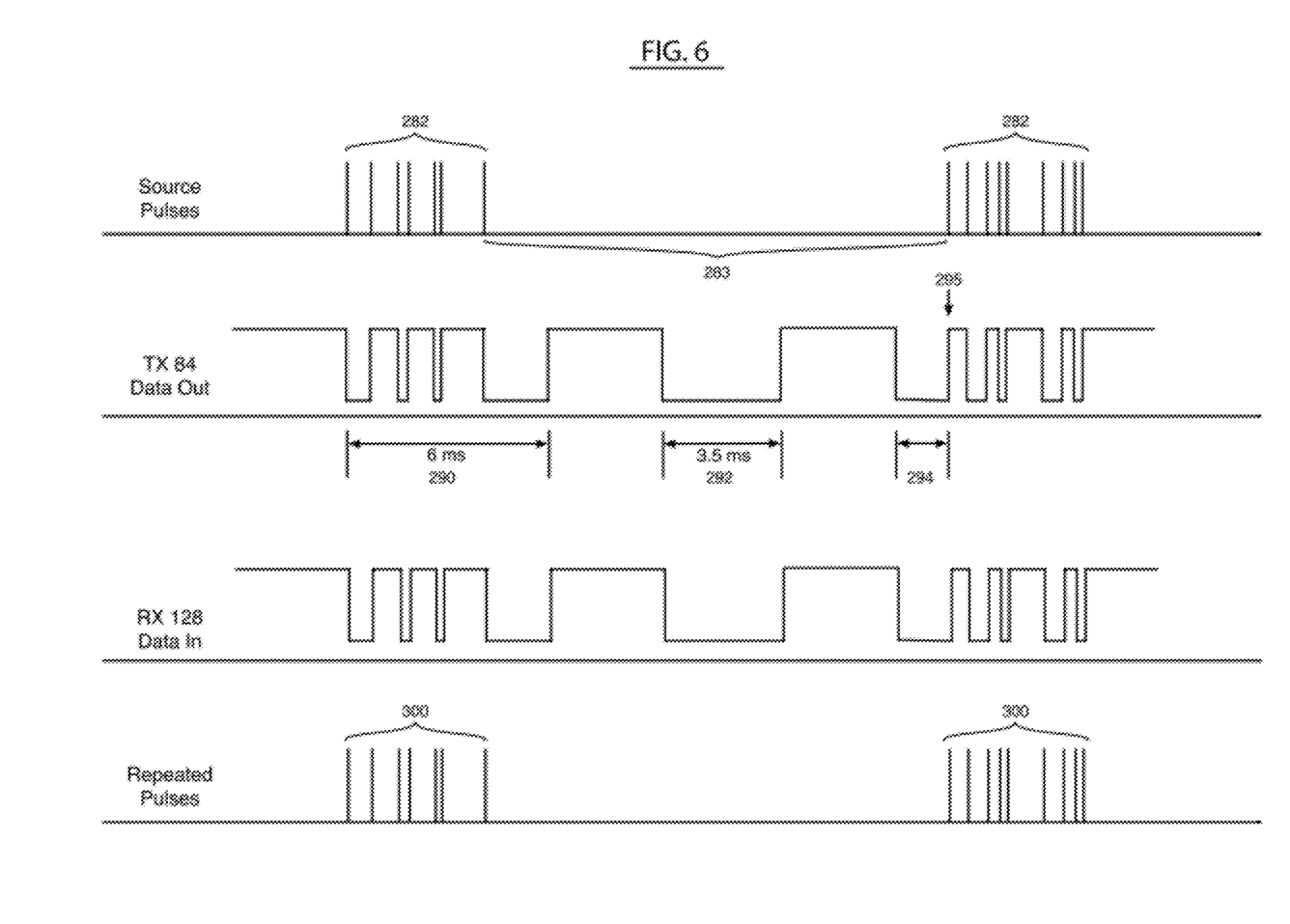
FIG. 6 is a chart showing the signals used to carry a data stream of the present invention.
Figure 9:
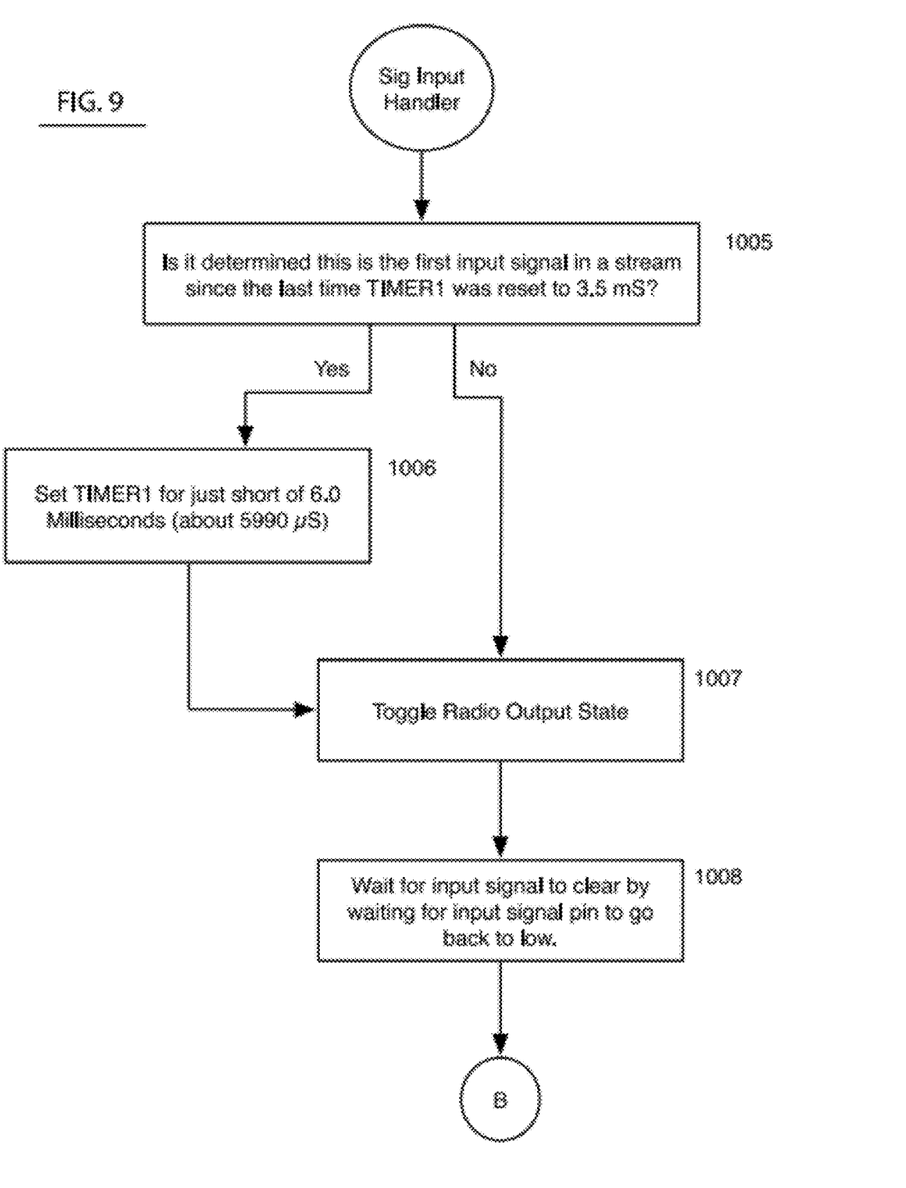

As shown in FIG. 9, the transmitter timer may be set to a different precise interval of time (1006), such as 5.99 ms, if the MCU determines that a high signal input is the first bit of a data stream (1005). The MCU can make this determination based on the most recent setting of the transmitter timer. Although another precise interval could be used, 6.00 ms is enough time for any data stream of the most popular camera systems to be completely sent. The beginning of every IR pulse detected will be represented by a change in the state of the radio output (1007). The MCU will wait until a high signal input is cleared (1008) before trying to detect another high signal input (1002). Alternatively, the 3.50 ms time interval could be reset after a bit is detected so long as the processing time needed to reset the transmitter timer was always less than the time between bits of the data stream. FIG. 6 charts first signals 282 that are significantly spaced 283 to show when a 6.00 ms precise interval 290 should be used rather than a 3.50 ms precise interval 292, and how an unexpected state change 295 may occur part way through 294 a precise interval, but that the second signals 300 do not show any state changes that occur at the end of any of the precise intervals.

Figure 3:
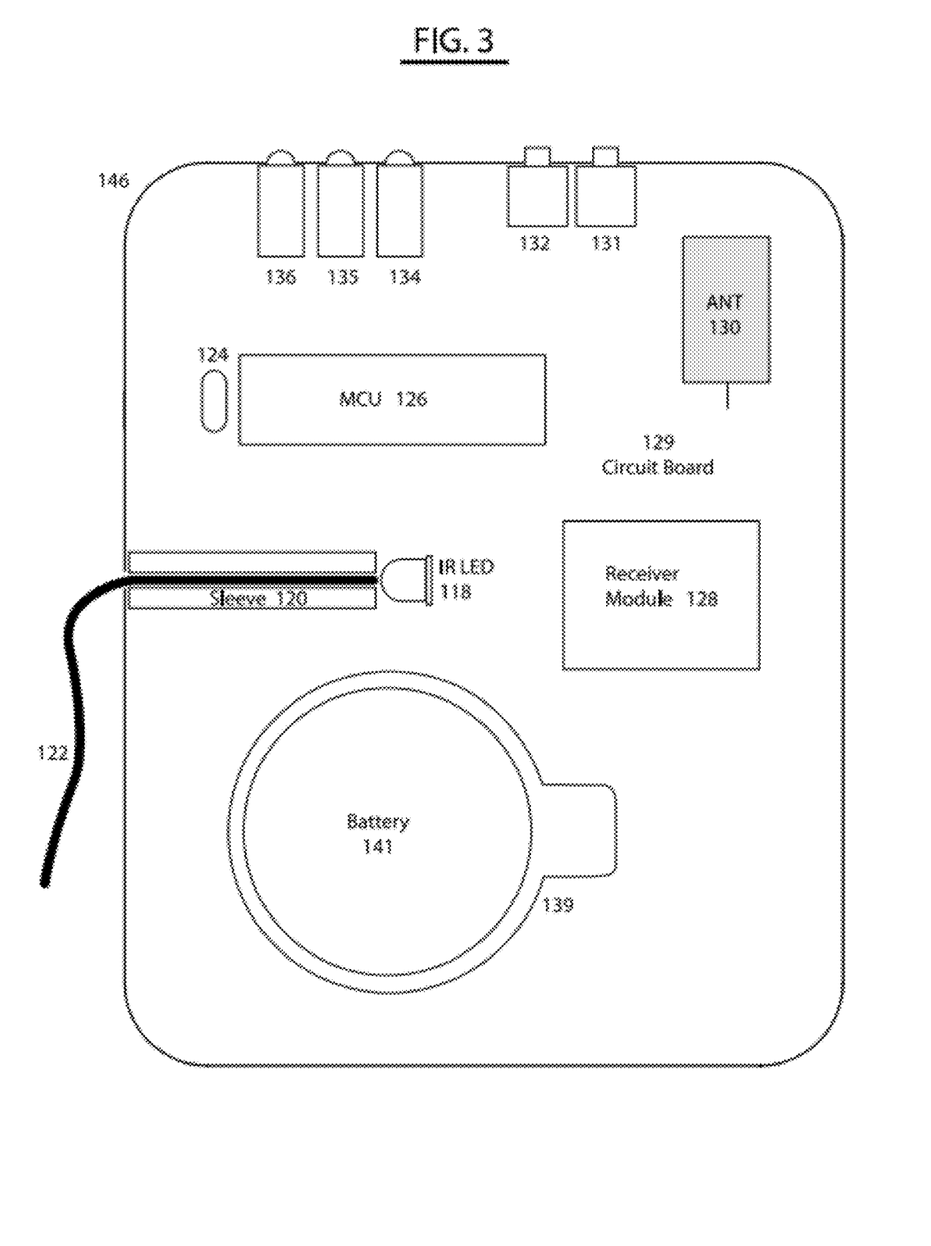
FIG. 3 is a plan view showing the internal layout of a receiver unit of the present invention.

When the radio signal is frequently changing between a high and low state in a known way, the receiver unit 116 can quickly process the radio signal and determine whether a change in frequency is an anticipated change or part or a data stream based on when a change in state occurs. Again, whether the state of the radio signal is high or low is not relevant, only when the state changes between high and low. The receiver unit transmits a data stream by sending the second signal only when a radio state changes at a time a change is not anticipated. As shown in FIG. 3, the major components of a receiver unit include a housing 146, a printed circuit board 129 (PCB), an emitter 118, a microcontroller 126 (MCU), an oscillator 124, a receiver module 128, an antenna 130 and a power supply 141. Similar to the transmitter unit already described, there are numerous known different ways to make a substantially similar receiver unit.

Figure 10:
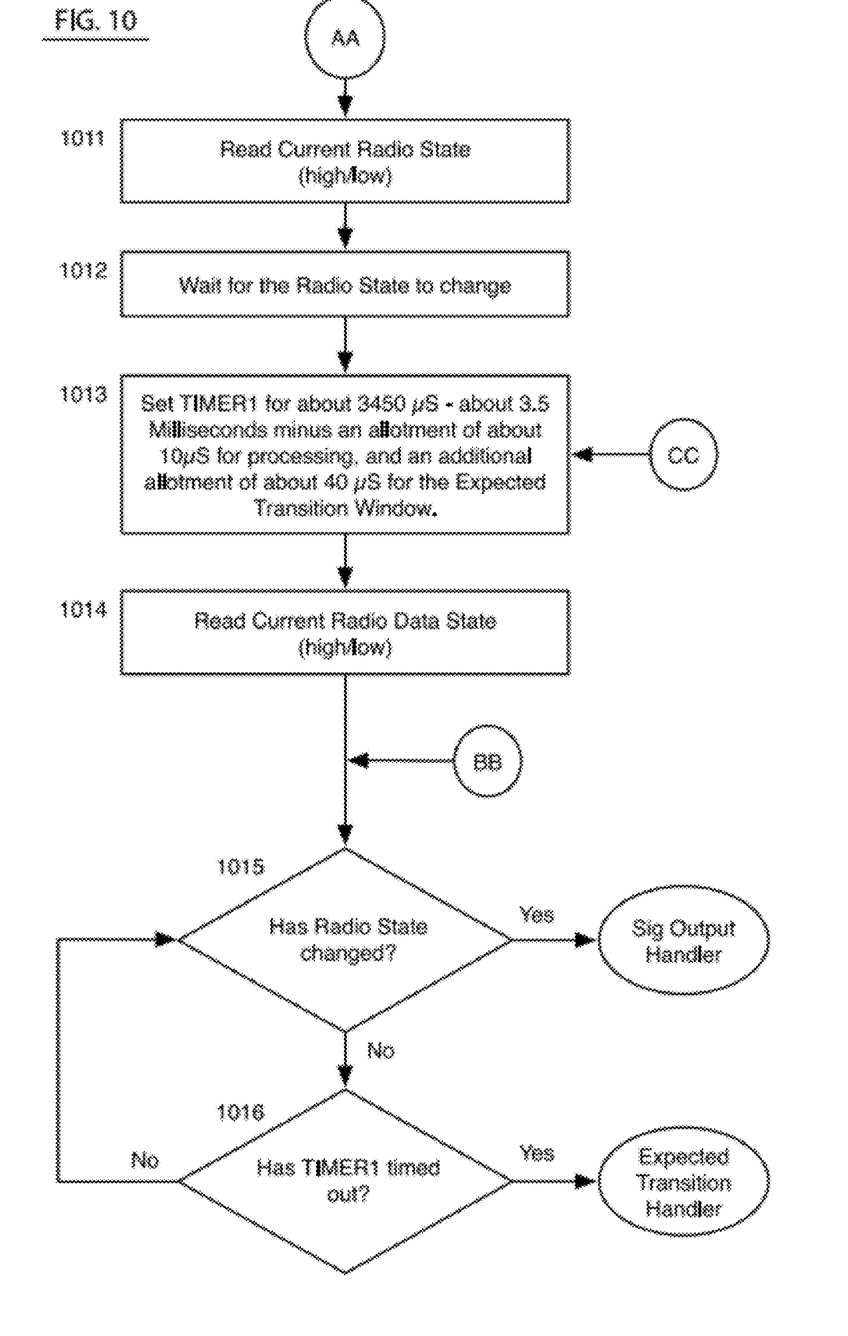
FIGS. 10 through 12 are flowcharts showing operations of the receiver unit.
Figure 11:
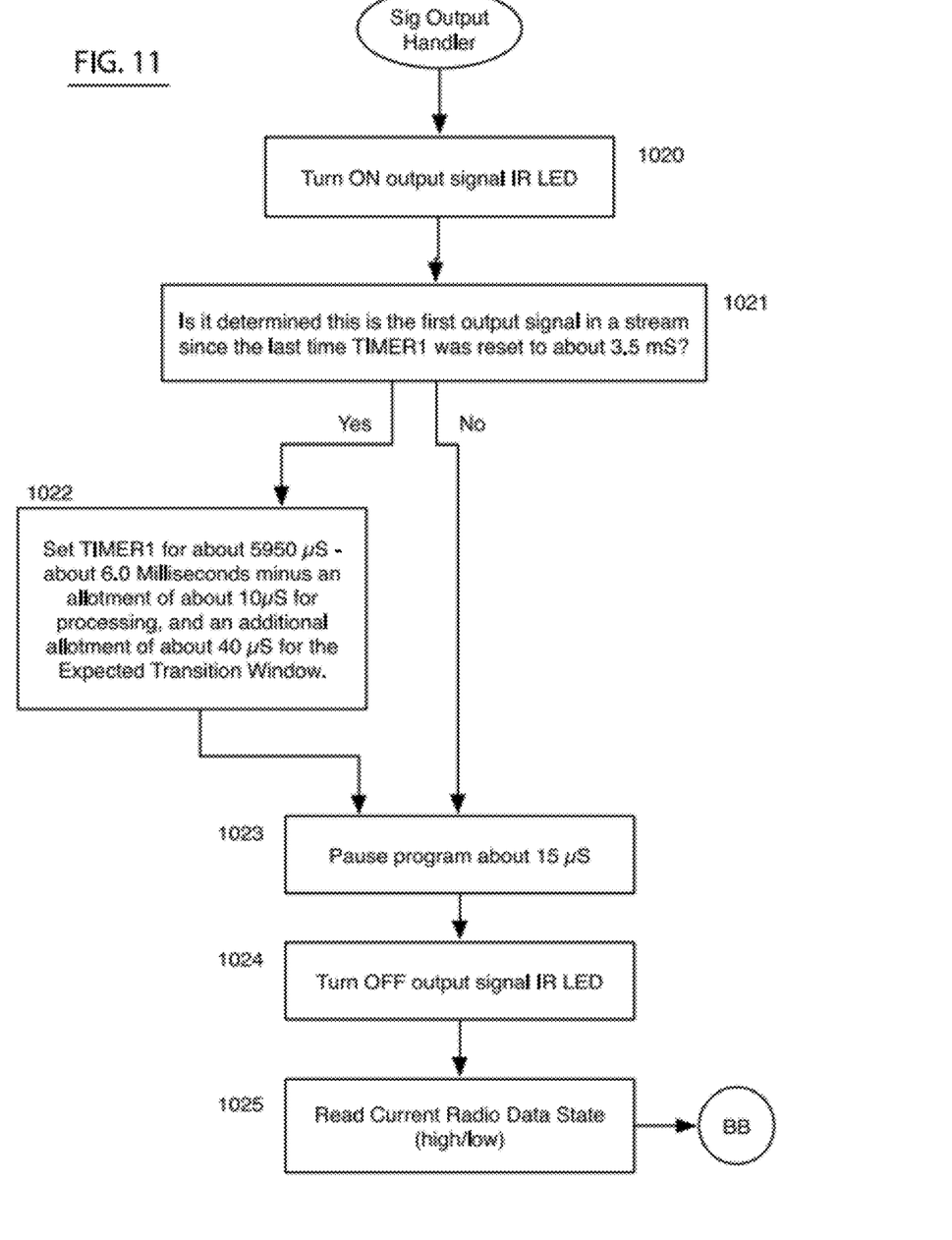
Figure 12:
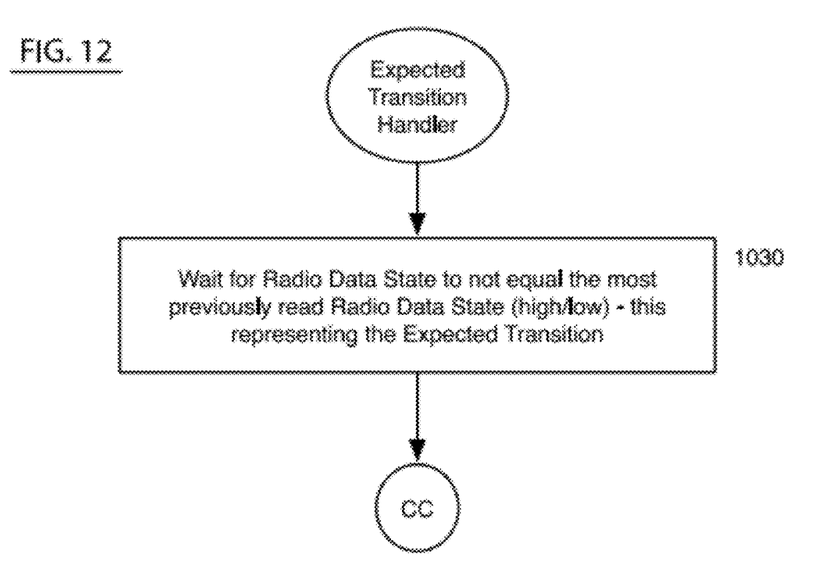

The receiver unit's MCU is loaded with computer code which operates the functions shown in FIGS. 10 through 12. Assuming that the receiver unit processing time is also about 10 microseconds, and that the receiver unit needs about a 40 microsecond window to look for an anticipated change in frequency, then a receiver unit operating on the same time interval example as above would set its receiver timer for about 3.45 ms or 5.95 ms, whichever most closely corresponds to the transmitter timer setting. The receiver timer and transmitter timer always start at very nearly the same time because the receiver timer starts when the receiver module detects that the radio signal state has changed, which is controlled by the transmitter unit, so the radio bridge always stays in sync.

As shown in FIG. 10, the receiver's MCU sets its timer (1011-1013) and looks for a radio signal state to unexpectedly change (1014-1015). If the radio signal changes state before the timer times out, then the receiver unit's IR emitter is powered on (FIG. 11 at 1020) while the MCU determines whether this output signal is the first bit of a data stream (1021). If yes, then the receiver timer is set for 5.95 ms (1022). The MCU program then waits for about 15 microseconds (1023) before turning the IR emitter off (1024). If the receiver timer times out, then the MCU waits for the radio signal to change state before setting the timer for 3.45 ms (FIG. 12 at 1030).

Because the preferred IR detector is an inductive pickup, only the start of an IR pulse is observed, which is why the receiver unit's MCU program needs to leave the IR emitter on for a defined period of time. For each bit in a data stream, existing camera systems only use the start of an IR pulse to characterize a bit, so the length of an IR pulse is inconsequential so long as it is detectable. Similarly, the transmitter unit only detects and processes the start of an IR pulse of the source device. By using this method, there is no need to verify that a detected IR pulse is part of a legitimate data stream, such as by waiting for other bits that must be part of a legitimate data stream, because an incomplete data stream will be ignored at the remote device. Alternatively, if the length of an IR pulse were considered relevant, the MCUs could be programmed to have an additional change in state at the end of an IR pulse, but this would cost about another 50 microseconds.

Figure 7:
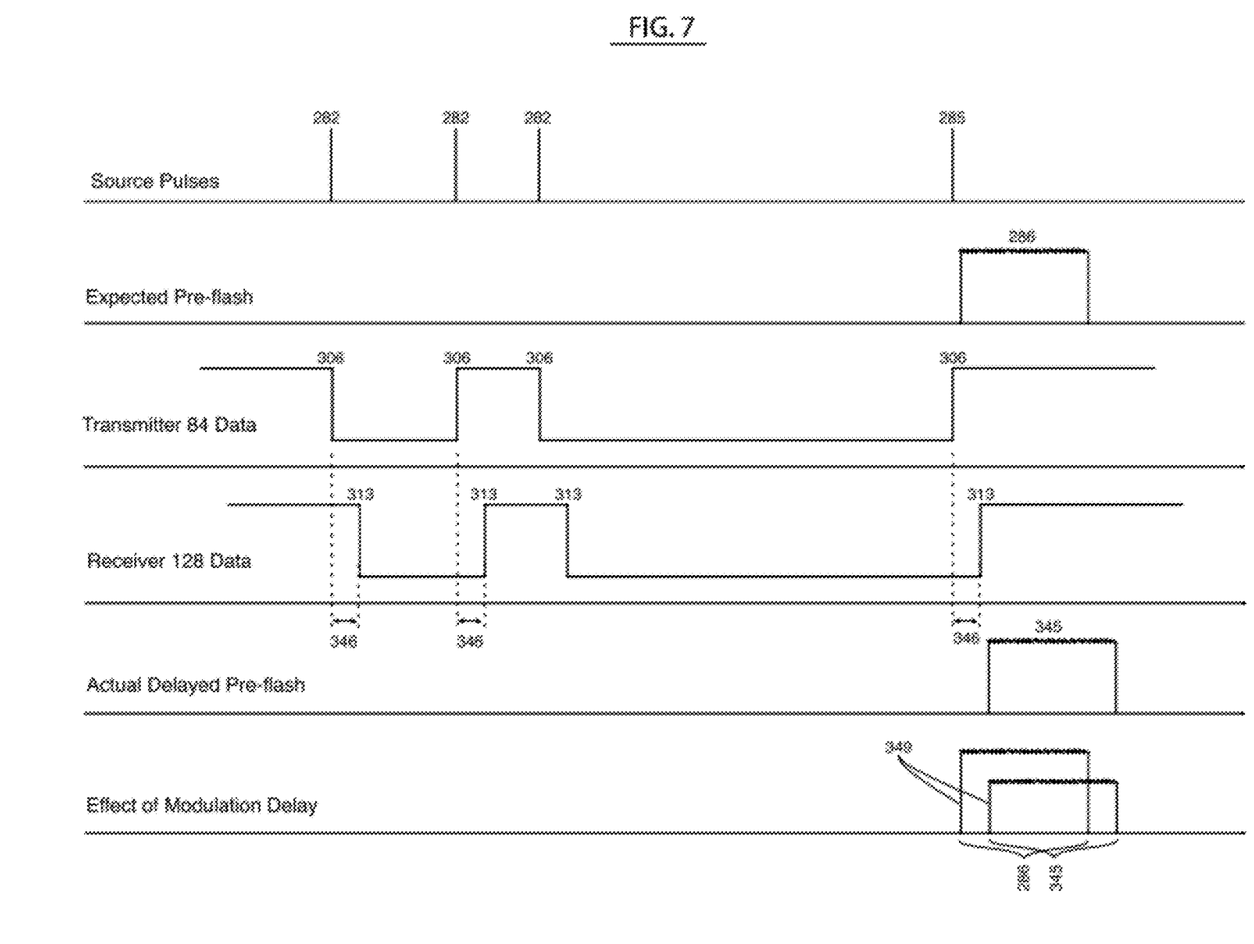
FIG. 7 is a chart showing the effects of modulation delay on signals.

The receiver unit's IR emitter 118 should start sending the second signal, which is substantially identical to the first signal 177, substantially before the second bit of the data stream is emitted by the source device 52. Although the second signal is reproduced in very near real time, there is a very small modulation delay. As shown in FIG. 7, an expected pre-flash 286 occurs slightly later 345 because of the modulation delay (346 and 349), which is charted against a data stream at various locations, namely: the source device, transmitter unit, receiver unit and remote device. In practice, the total modulation delay is clearly less than the spacing between IR pulses (282 and 285) of the source device, or between state changes of the radio signal (306 and 313). The modulation delay is unlikely to cause a problem at the remote device because the time of the delay is relatively insignificant compared to the overall operation of the camera system, and because the data stream itself is uniformly shifted by the same amount. This characteristic is especially important for the proper function of a high speed sync.

Figure 4:
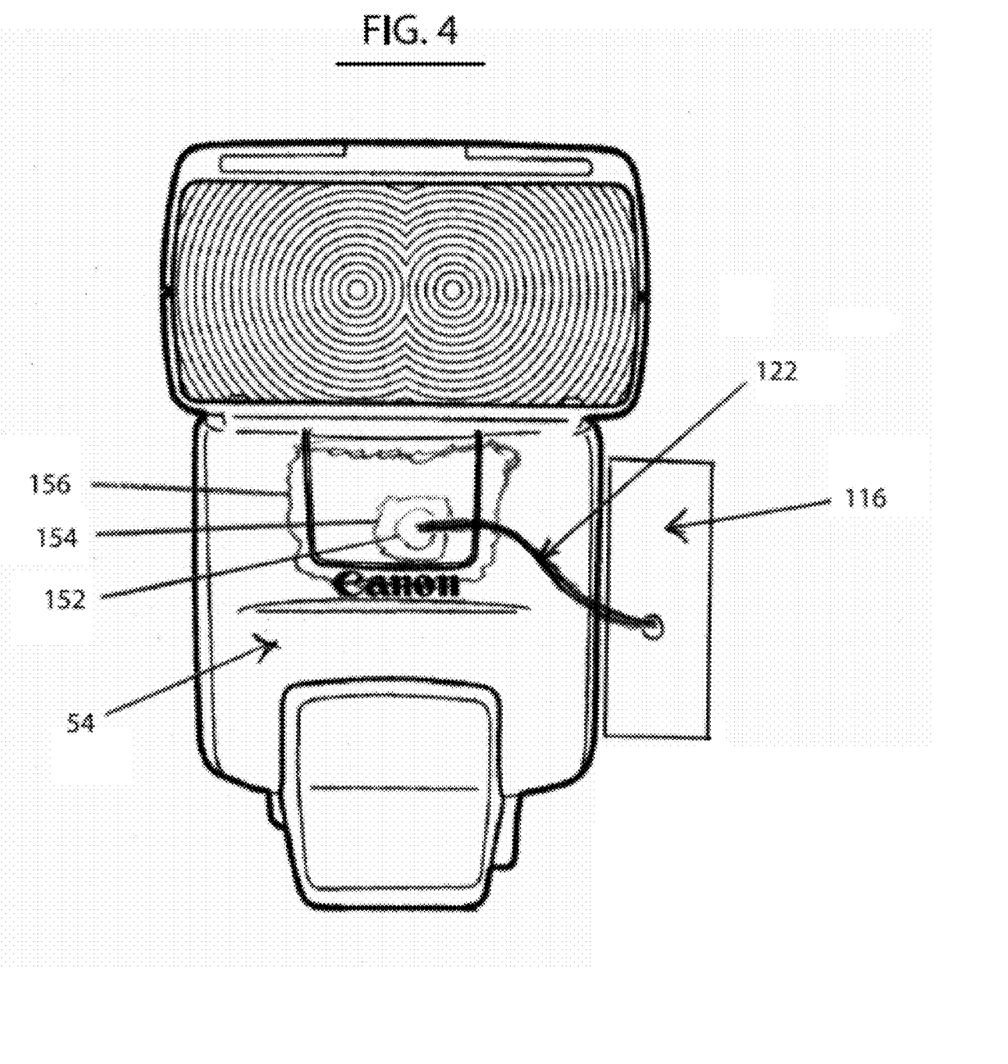
FIG. 4 is a perspective view showing the IR sensor of the remote device covered to block the first signal from reaching the remote device.

The only time that a modulation delay could cause a problem is where the source device and remote device are separated by a distance that is near the range of an IR system. When the camera system is well within its range, all of the first signal is detected by the remote device, and the second signal just intensifies each IR pulse detected. If the camera system is not within range, only the second signal is detected by the remote device. If, however, the first signal is only partially detected, then the modulation delay could be inconsistently mixed into the second signal. As shown in FIG. 4, to avoid this potential problem, a piece of black tape 156, or other material, can simply be used to cover the IR detector 152 of the remote device 54 or, alternatively, the IR emitter of the source device.

To make sure that the IR pulses generated by the transmitter unit are detected by the remote device, the light from an IR emitter can be transmitted to the remote devices IR detector through optical fiber, similar to the method already described above as a way to detect the IR pulses that make up the first signal which carries the data stream. As shown in FIG. 4, where the receiver unit 116 directs the second signal through an optical fiber 122, the end of the optical fiber can additionally be reflected toward the IR detector using a reflector 154.

While a preferred form of the invention has been shown and described, it will be realized that alterations and modifications may be made thereto without departing from the scope of the following claims.

What is claimed is:

1. A method for retrofitting a camera system comprising the steps of:
   detecting a first signal while it is being sent by a source device of the camera system to a remote device of the camera system;
   wirelessly transmitting a data stream, which includes control instructions and trigger instructions, detected in the first signal using a transmitter unit;
   wirelessly receiving the data stream using a receiver unit;
   converting the data stream into a second signal that is substantially the same as the first signal and forming the second signal as light pulses; and
   directing the second signal toward the remote device, the remote device being responsive to the light pulses.

2. The method of claim 1 further comprising the step of preventing the first signal from being detected by the remote device.

3. The method of claim 2 wherein the step of preventing is characterized by covering a portion of the camera system with a material.

4. The method of claim 2 wherein the step of detecting is characterized by electrically connecting the transmitter unit to an external port on the source device.

5. The method of claim 1 wherein the step of detecting the first signal is characterized by detecting IR pulses.

6. The method of claim 1 wherein the step of detecting is further characterized by inductively detecting an electric field produced by the source device when the source device generates the first signal in the form of IR pulses.

7. The method of claim 1 further comprising the step of positioning an optical fiber between the source device and the transmitter unit.

8. The method of claim 1 further comprising the step of positioning an optical fiber between the remote device and the receiver unit.

9. The method of claim 1 further comprising the step of at least partially refracting the first signal toward the transmitter unit.

10. A method for providing a radio bridge for a camera system comprising the steps of:
    detecting a first signal while it is being sent by a source device of the camera system;
    changing a state of a radio transmission transmitted by a transmitter module substantially upon detecting a first bit of the first signal;
    wirelessly transmitting the state using the radio signal;
    wirelessly receiving the state at a receiver module;
    powering an emitter to send a first bit of a second signal in the form of a light pulse upon receiving the state; and
    directing the light pulse toward a remote device of the camera system.

11. The method of claim 10 further comprising the steps of:
    starting a precise interval;
    changing the state of the radio transmission transmitted by the transmitter module at the end of the precise interval; and
    wherein the radio signal is using frequency-shift keying modulation.

12. The method of claim 11 further comprising the steps of:
    waiting, substantially near the end of the precise interval, for the state to change at the receiver module; and
    assuming that a change in the state received while waiting is not part of the first signal.

13. The method of claim 12 further comprising the steps of:
    canceling the precise interval after detecting the first bit of the first signal; and
    starting a second precise interval after canceling the precise interval.

14. The method of claim 13 further comprising the steps of:
    changing the state on the transmitter module while detecting a second bit of the first signal; and
    powering an emitter to send a second bit of the second signal.

15. The method of claim 10 characterized by powering the emitter to send the first bit of the second signal before detecting a second bit of the first signal.

16. The method of claim 10 further comprising the step of deleting a memory of the first bit before detecting a complete data stream in the first signal.

17. The method of claim 11 wherein the precise interval is less than six milliseconds and accurate to within 20 microseconds.

18. The method of claim 13 wherein the precise interval is shorter than the second precise interval.

19. The method of claim 10 wherein the step of detecting is characterized by inductively detecting.

20. The method of claim 10 wherein the step of directing is at least partially characterized by an internal reflection of light.

21. A method for providing a radio bridge for a camera system comprising the steps of:
inductively detecting a first signal while it is being sent by a source device of the camera system;
changing a state on a transmitter module substantially while detecting a first bit of the first signal;
wirelessly transmitting the state using a radio signal;
wirelessly receiving the state at a receiver module;
powering an emitter to sent a first bit of a second signal; and
directing the second signal toward a remote device of the camera system.

22. A device for use with a camera system comprising:
an antenna configured to receive a radio signal indicative of flash control instructions for controlling a flash unit;
an emitter for emitting light pulses, the light pulses corresponding with respective state changes of the radio signal wherein the light pulses are perceptible to the flash unit to produce a desired light output for flash photography.

23. The device of claim 22 wherein the emitter includes an LED configured to produce the light pulses, a first end of an optical fiber optically coupled with the LED, a second end of the optical fiber configured to be positioned so the light pulses produced by the LED can be observed by the flash unit.

24. The device of claim 23 wherein the light pulses are infrared light pulses.

25. The device of claim 22 wherein the antenna is further configured to receive a radio signal indicative of triggering instructions, and the emitter is further configured to emit additional light pulses which are perceptible to the flash unit to cause the flash unit to emit a flash.

26. A method for providing a radio bridge for a camera system comprising the steps of:
detecting the generation of a pulsed light signal emitted by a source device of the camera system to convey a data stream, which includes control instructions and trigger instructions, to a remote device thereof;
changing a state of a radio transmission transmitted by a transmitter module upon detecting the generation of the signal;
wirelessly transmitting the state using a radio signal;
wirelessly receiving the state at a receiver module;
powering an emitter to generate a pulsed light signal configured to convey the data stream upon receiving the state; and
directing the pulsed light signal toward the remote device.

27. The method of claim 26, wherein detecting the generation of a pulsed light signal emitted by a source device of the camera system includes inductively detecting an electric field produced by the source device when generating the pulsed light signal.

28. The method of claim 26, wherein the data stream includes a series of bits of data, wherein detecting the generation of a pulsed light signal is performed in real time, wherein changing a state of a radio transmission is performed upon detecting the first bit of data in the data stream, and wherein powering an emitter to generate a pulsed light signal is performed prior to the detection of the second bit of data in the data stream.

29. A receiver unit for use with a camera system having a source device operable to generate instructions for controlling the operation of a remote flash unit, the receiver unit comprising:
a receiving component adapted to receive a radio signal representing the instructions generated by the source device;
an emitter adapted to emit light pulses perceptible to the remote flash unit to produce a desired operation thereof; and
circuitry adapted, upon receiving the radio signal by the receiving component, to operate the emitter to emit light pulses representative of the instructions of the received radio signal.

30. The receiver unit of claim 29, wherein the instructions generated by the source device include control instructions for setting operating parameters of the remote flash unit to produce a desired light output, and triggering instructions for operating the remote flash unit to emit a light output; and wherein the circuitry is adapted to prompt the emitter to emit light pulses representative of the instructions, with the light pulses representing the control instructions preceding the light pulses representing the triggering instructions.

31. The receiver unit of claim 29, wherein the emitter is configured to direct the emitted light pulses to the remote flash unit.

32. A radio communication device for use with a flash device operable to generate a pulsed light signal conveying a data stream and consisting of one or more pulses of light, the radio communication device comprising:
a microprocessor;
a sensing element adapted to detect the generation of at least one pulse of light by the flash device; and
a radio signal transmitter;
wherein the microprocessor is adapted, upon detection of the generation of the at least one pulse of light by the sensing element, to operate the radio signal transmitter to transmit a radio signal representative of the at least one pulse of light generated by the flash device.

33. A radio communication device for use with a flash device adapted to perceive a data stream conveyed by a pulsed light signal consisting of one or more pulses of light, the radio communication device comprising:
a microprocessor;
a light element operable to emit one or more pulses of light; and
a radio signal receiver;
wherein the microprocessor is adapted, upon receiving a radio signal by the radio signal receiver, to operate the light element to emit a pulsed light signal conveying a data stream representative of the received radio signal.

* * * * *